United States Patent [19]
Jörneskog

[11] 3,813,213
[45] May 28, 1974

[54] FURNACE PLANT FOR THE DRYING OR BAKING OF COATED ARC WELDING RODS

[75] Inventor: Karl Oskar Inge Jörneskog, Perstorp, Sweden

[73] Assignee: Elektriska Svetsningsaktiebolaget, Gothenburg, Sweden

[22] Filed: Mar. 19, 1973

[21] Appl. No.: 342,405

[30] Foreign Application Priority Data
Mar. 30, 1972 Sweden.............................. 4244/72

[52] U.S. Cl.................. 432/121, 432/123, 432/253
[51] Int. Cl................................................ F27b 9/14
[58] Field of Search........... 432/121, 122, 123, 124, 432/253

[56] References Cited
UNITED STATES PATENTS
3,489,398   1/1970   Hunt.................................. 432/122

Primary Examiner—John J. Camby
Attorney, Agent, or Firm—Cameron, Kerkam, Sutton, Stowell & Stowell

[57] ABSTRACT

A tunnel furnace plant for the drying or baking of coated arc welding rods in which the welding rods are suspended freely from straight carriers extending transversely to the direction of advancement through the furnace, each of said carriers carrying a row of welding rods. The plant also includes automatic equipment for fitting the welding rods to the carriers.

9 Claims, 15 Drawing Figures

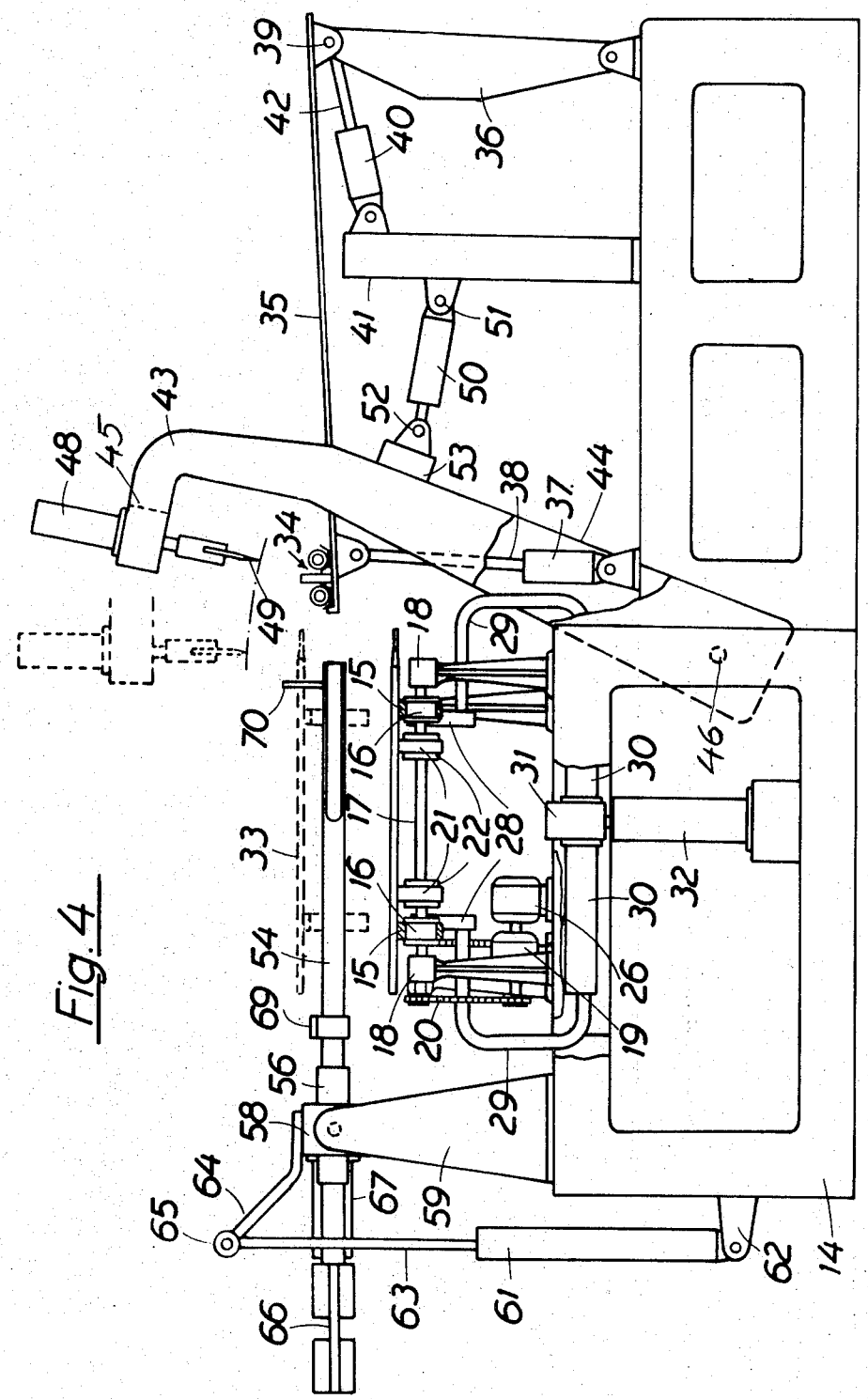

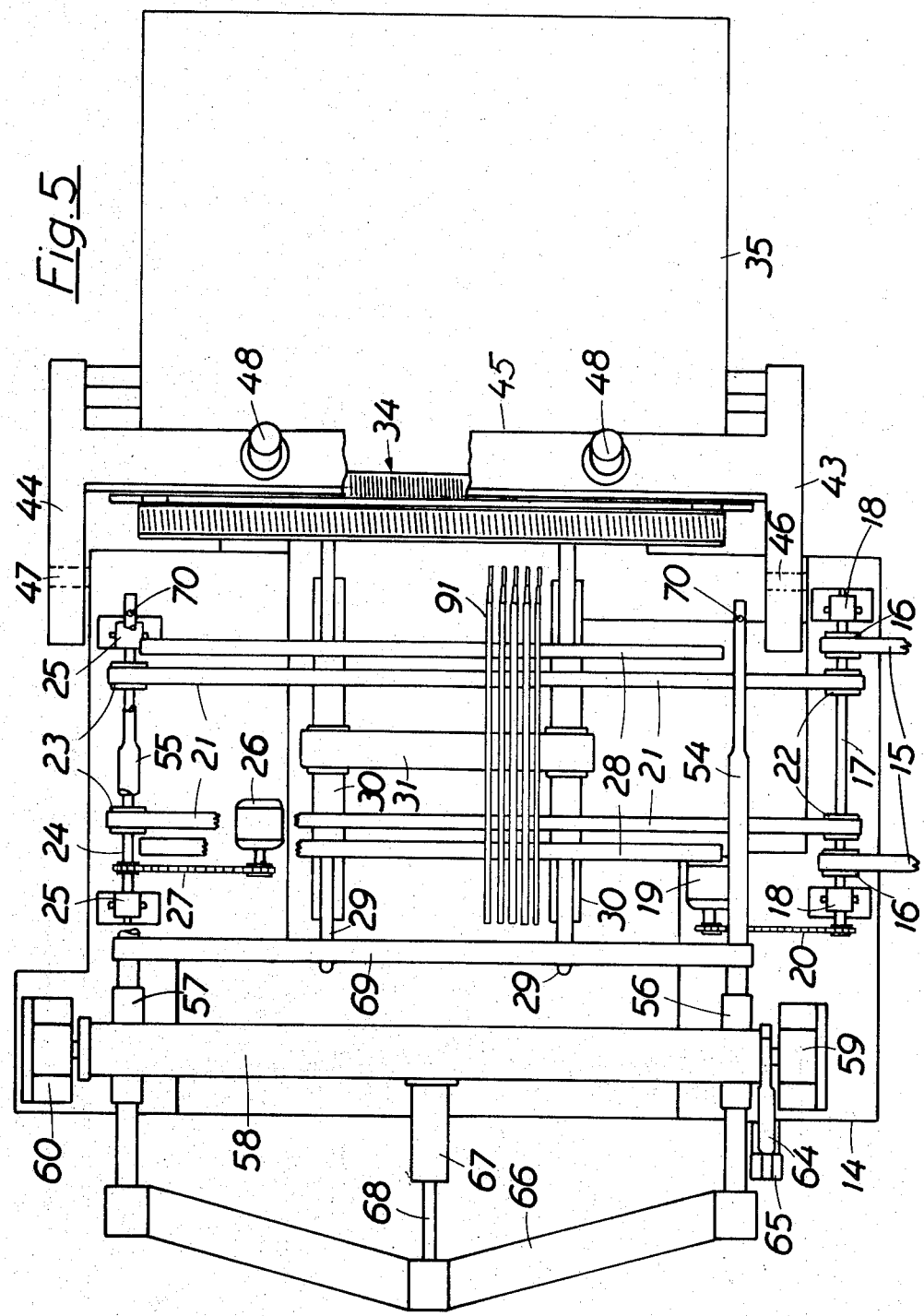

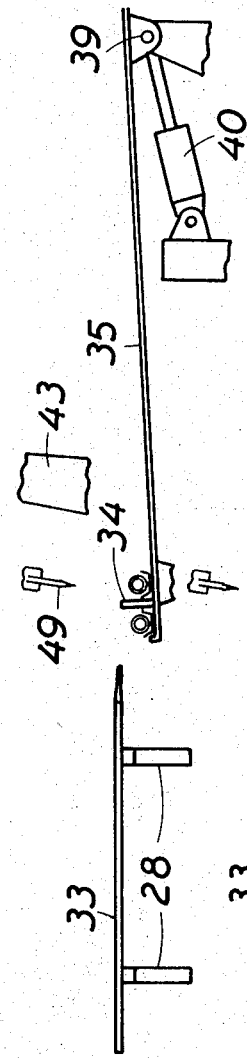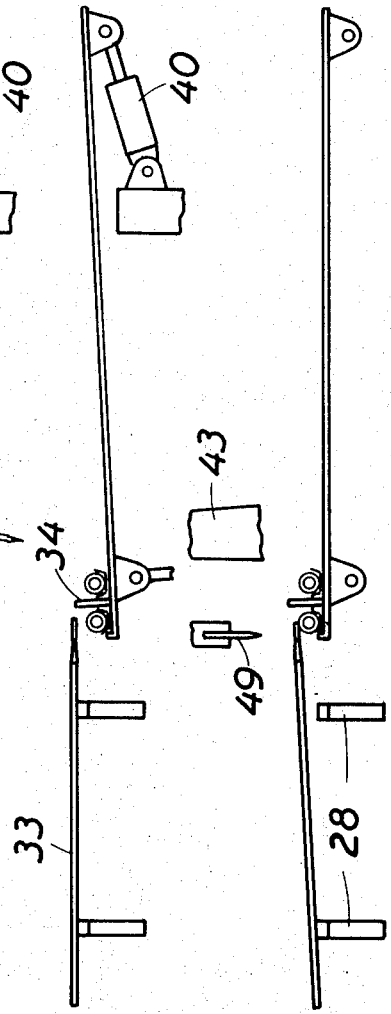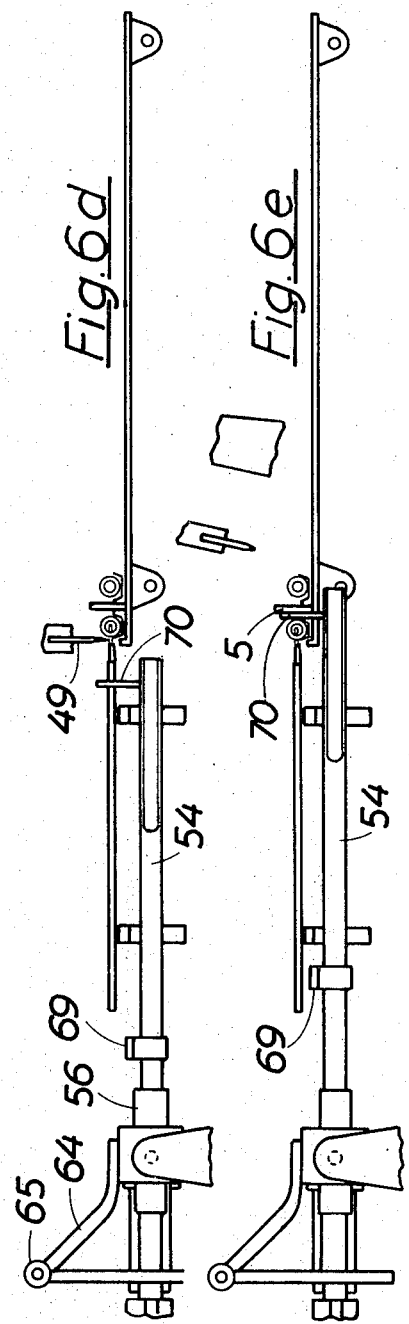

FURNACE PLANT FOR THE DRYING OR BAKING OF COATED ARC WELDING RODS

BACKGROUND OF THE INVENTION

In the usual method of furnace drying or baking coated arc welding rods, the welding rods (one end of which has been stripped of coating) are piled on movable stands or trolleys so as to form more or less thick layers, said stands or trolleys being then inserted into a chamber furnace or advanced through a tunnel furnace. It is, however, a well-known fact that this method has certain disadvantages which could be avoided by allowing the welding rods to hang down freely during the drying or baking process, resulting in uniform conditions for all of the welding rods and for all parts of the surface of the individual rods. Also, there would be no danger of deformation of the coating and of sticking of adjacent coatings to each other. Welding rod drying plants based on this idea have in fact been built; in these plants, a row of welding rods are suspended from an endless conveyor chain by means of permanent magnets. To provide the required capacity of the drying plant it is necessary to employ a very long chain arranged to describe a zig-zag-shaped path through the furnace, and/or to employ a plurality of conveyor chains working in parallel. A drying plant of this type is expensive and takes up much space.

The invention provides an improved furnace plant for the drying or baking of coated arc welding rods while freely suspended which is of simple, economical and compact construction. The invention also provides improved means for suspending welding rods which does not rely on their magnetic properties.

SUMMARY OF THE INVENTION

The furnace plant of the present invention comprises a set of welding rod carriers, each of which comprises a straight, elongated body or frame provided with supporting lugs at either end and a row of welding rod retaining members spaced along and attached to said body or frame, a belt conveyor for conveying a stream of humid welding rods extending transversely to the conveyor, said belt conveyor having a delivery section, a welding rod fitting station comprising means for supporting a welding rod carrier lengthwise of end at a level above said delivery section, and means for removing a row of welding rods from said delivery section into a position in which the stripped ends of the welding rods are caught by the welding rod retaining members of the welding rod carrier, a tunnel furnace provided with a pair of tracks for the supporting lugs of said welding rod carriers and means for advancing the welding rod carriers along said tracks, and, means for transferring a welding rod carrier with its load of welding rods from the welding rod fitting station to the tracks at the entrance end of the tunnel furnace.

In a preferred embodiment of the invention, each of the welding rod carriers is provided with a spiral spring extending along and attached to the body or frame of the welding rod carrier, said spiral spring being wound with spaced turns between which the stripped welding rod ends are gripped.

Further advantages and benefits of the present invention will become apparent from the following description of a preferred embodiment, taken in conjunction with the accompanying drawing.

BRIEF DESCRIPTION OF THE DRAWINGS

FIG. 4 is an elevational view of the welding rod fitting station of the plant,

FIG. 5 is a plan view from above of the welding rod fitting station,

FIG. 6a to e show certain parts of the welding rod fitting station, viewed in the same way as in FIG. 4, in different positions illustrating the successive steps of the welding rod fitting operation.

The FIGS. 4–9 as well have been somewhat schematized in order to illustrate the function of the apparatus as clearly as possible.

DESCRIPTION OF THE PREFERRED EMBODIMENTS

Figure 1:
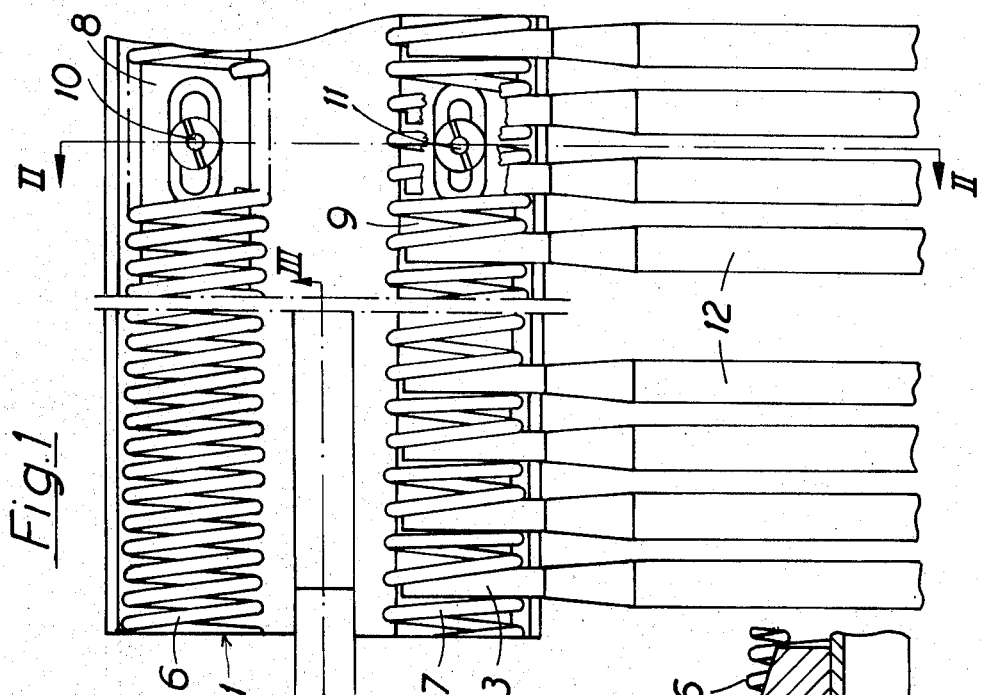
FIG. 1 is a fragmentary elevational view of a welding rod carrier.
Figure 2:
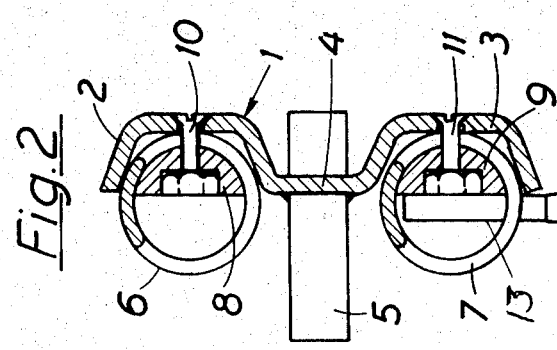
FIG. 2 is a sectional view taken along II—II in FIG. 1.
Figure 3:
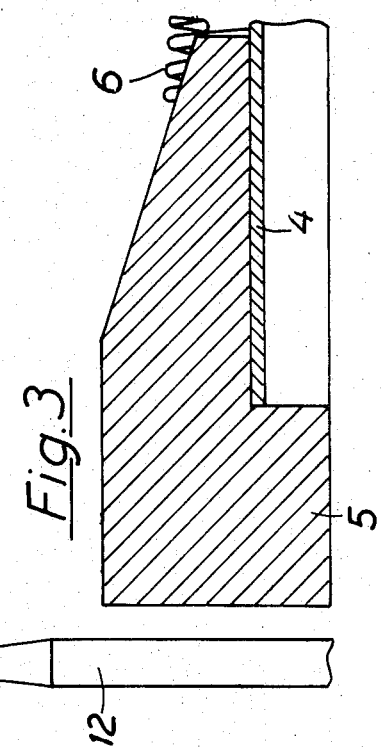
FIG. 3 is a sectional view taken along III—III in FIG. 1.

The welding rod carrier shown in FIGS. 1–3 consists of a profiled rail 1 having two parallel, channel-shaped portions 2, 3 joined by a flat portion 4. A pair of strip steel lugs 5 protruding beyond the end of the rail are welded each to one end of the flat portion 4. Each of the channel-shaped portions 2, 3 is fitted with a spiral spring 6, 7, respectively, retained by a bar 8, 9 attached to the channel-shaped portion by means of screws 10 spaced along the rail. To attach the welding rods 12 to be dried to the carrier, their bare ends 13 are forced into the spring from one side, so that each end is clamped between two adjacent turns of the spring. One only of the springs (in the case illustrated, the spring 7) is functioning at one time. The two springs have different pitches, so that one spring can be used for holding welding rods having diameters within a lower range and the other spring can be used for holding welding rods having diameters within a higher range.

The fitting or mounting of the welding rods on the carrier is performed automatically in the welding rod fitting station shown in FIGS. 4, 5, the different parts of which are supported by a common body or frame 14. A stream of welding rods which extend transversely to the direction of advancement and which are approximately evenly spaced are advanced towards the welding rod fitting station by a conveyor comprising two parallel, endless conveyor belts 15 each of which is driven by a wheel 16 attached to a shaft 17 rotatably supported by a pair of bearing pedestals 18 and driven by a motor 19 through a chain transmission 20. The conveyor 15 delivers the welding rods to a second conveyor comprising a pair of parallel, endless conveyor belts 21 running over a pair of wheels 22 rotatable in bearings supported by the shaft 17, each of said belts being driven by a wheel 23 attached to a driving shaft 24 rotatably supported by a pair of bearing pedestals 25 and driven by a motor 26 through a chain transmission 27. The speed of the motor 26 (in practice, a driving unit consisting of a motor and a variable transmission device is employed) is adjustable, whereby the spacing of the welding rods 91 advanced by the belts 21 may be adjusted as desired. A few only of said welding rods are shown in FIG. 5. Preferably the speed of the motor 19 as well is adjustable, in order to make it possible to avoid too large a difference between the speeds of the cooperating conveyors 15, 21.

When the carpet of welding rods successively formed on the conveyor 21 has arrived at the rear end of said conveyor, a pair of lifting bars arranged parallelly to each other outside the edges of the conveyor belts are rendered operative to lift said carpet from the conveyor. Each of said lifting bars is supported by a pair of curved arms 29 each of which is attached to a piston movable in a pneumatic cylinder 30 attached to a common beam 31 which is vertically displaceable by means of a pair of pneumatic cylinders 32. In the lifting operation just referred to, the pneumatic cylinders 32 only are active, so that the lifting bars 28 are moved vertically upwards to a new position indicated with dotted lines in FIG. 4. During said lifting operation and the subsequent steps to be described below, the advancement of welding rods delivered by the conveyor 15 is going on without intermission to form the next carpet of welding rods. The anterior ends of the lifting bars (that is, the ends facing the arriving stream of welding rods) are bevelled downwards-rearwards in order to go clear of the arriving welding rods during the first moments of the lifting movement.

The carpet 33 of welding rods thus lifted shall now be fitted onto a welding rod carrier 34 of the type described in connection with FIGS. 1 to 3. The carrier 34 is supported by a table 35 continuously supplied with empty carriers by means of conveyor means not shown. The table is supported by a link system comprising two rear links 36 and a pair of front links consisting each of a pneumatic cylinder 37 and its piston rod 38. Thus, the table may be rotated about the upper joint 39 of the rear links 36 by means of the pneumatic cylinders 37. Horizontal displacement of the table is effected by means of a pneumatic cylinder 40 pivotally mounted on a stationary support 41, the piston rod 42 of said cylinder being connected with the rear end of the table by means of a joint aligned with the upper joints 39 of the links 36.

The anterior portion of the table 35 is straddled by a portal girder composed of two shanks 43, 44 and a yoke 45, the lower extremities of the shanks being pivotally mounted on a pair of pins 46 and 47 attached to the machine frame. The yoke 45 carries a pair of pneumatic cylinders 48, the piston rods of which carry a pusher blade 49. The portal girder can be swung from the inoperative position represented with full lines to an operative position indicated with dotted lines by means of a pneumatic cylinder 50 pivotally mounted on the stationary support 41 at the point 51, the piston rod of said cylinder being connected by a joint 52 to a cross bar 53 joining the shanks 43, 44.

The successive steps of the operation required for the attachment of the welding rod carpet 33 to the front one of the pair of spiral springs of the carrier 34 shall now be described with reference to FIGS. 6a to e. FIG. 6a represents the welding rod carpet 33, the table 35 with a carrier 34 resting thereon, and the pusher blade 49 in the positions of FIG. 4. The pneumatic cylinder 40 is now rendered active to move the table into the position shown in FIG. 6b, in which the front spring of the carrier 34 lies vertically below the bare ends of the welding rods 33. In the next step (FIG. 6c), the front end of the table 35 is raised by means of the cylinder 37 sufficiently to cause the spiral springs to contact the bare ends of the welding rods and to lift up the welding rods from the adjacent lifting bar 28 sufficiently to allow the clamping operation described below to proceed without obstruction. The portal girder carrying the pusher blade 49 is swung forward by means of the cylinder 50 to the position shown in FIG. 6c, in which the pusher blade is situated above the stripped ends of the welding rods, more particularly above the border region between the stripped end and the coated portion of the welding rods. This movement of the portal girder does of course not have to be carried out simultaneously with the described raising of the front edge of the table, but can be effected earlier. The cylinders 48 are now rendered active to move the pusher blade 49 downwards to the position of FIG. 6d, in which the lower edge of the pusher blade has forced the welding rod ends into the spaces between the turns of the spring (cf. FIG. 2).

The lifting arm 54 shown in FIG. 6d and not previously referred to is one of a pair of lifting arms 54, 55 shown in FIG. 5, said arms being each slidably supported by a guide sleeve 56, 57. The guide sleeves are attached to a beam 58 mounted for rotation in bearing pedestals 59, 60. Said beam is arranged to be rotated 90° by means of a pneumatic cylinder 61 (FIG. 4) pivotally mounted on a rigid support 62, its piston rod 63 being connected by means of a hinge joint 65 with an arm 64 protruding from the beam 58. The rear ends of the lifting arms 54, 55 extending rearwards from the guide sleeves 56, 57 are joined by a yoke 66. The lifting arms are displaceable in their guide sleeves by means of a pneumatic cylinder 67 mounted on the rotary beam 58, the piston rod 68 of said cylinder being connected to the yoke 66. At the other side of the rotary beam 58 the lifting arms 54, 55 are joined by a bridge member 59. In FIG. 6d the lifting arms 54, 55 occupy the same position as in FIG. 4. The pneumatic cylinder 67 is now activated to displace the lifting arms to the position shown in FIG. 6e, in which the ends of the lifting arms extend below the lugs (5, FIG. 1) protruding at the ends of the carrier, while the bridge member 69 is below the coated ends of the welding rods.

The pneumatic cylinder 61 is now activated to rotate the lifting arms 54, 55 into a vertical position. During the rotary movement, the free (coated) ends of the welding rods are supported by the bridge member 69. The weight of the carrier and the welding rods is gradually taken over by a support pin 70 provided on each of the lifting arms near its extremity, the flat side of the lug engaging said pin.

The return of the lifting bars 28 to the position shown in FIG. 4 is commenced before the lifting arms 54, 55 have reached the end of their upwards angular movement. First, the pneumatic cylinders 30 are activated to move the lifting bars apart as far as required to make them during the subsequent lowering motion go clear of the welding rod carpet which is being advanced by the conveyor 21. The lifting bars are now lowered to their bottom position by means of the pneumatic cylinders 32 and are now ready to raise the next welding rod carpet as soon as it arrives at the end of the conveyor 21.

Figure 7:
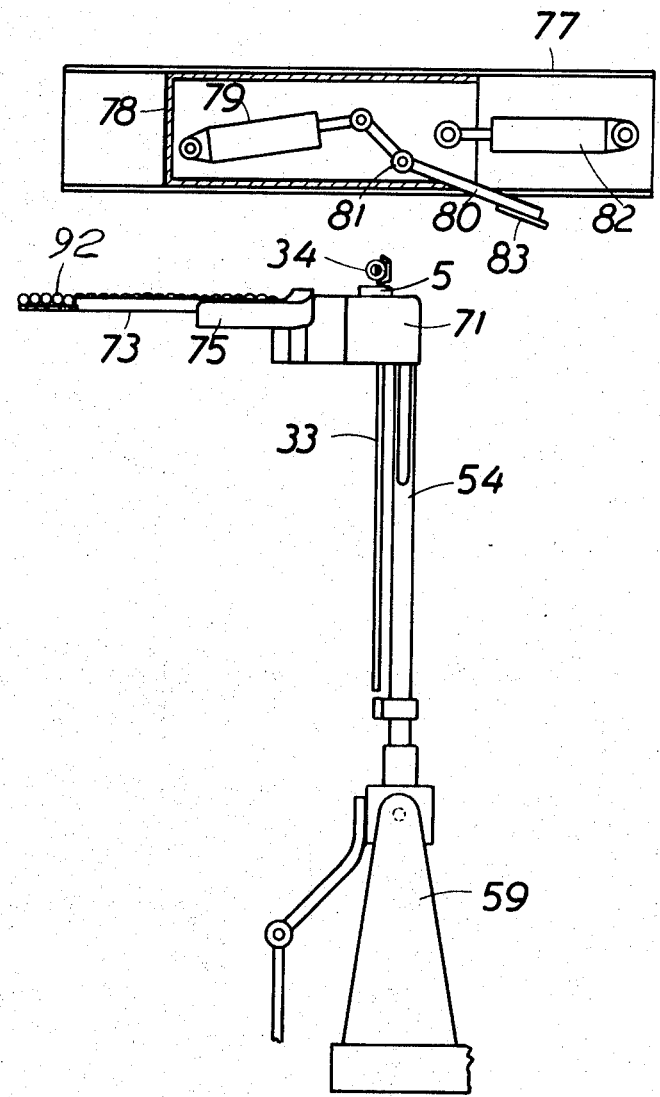
FIG. 7 is an elevational view of part of the welding rod fitting station, viewed in the same way as in FIG. 4, and the entrance end of a pair of tracks for conveying the welding rod carriers through the tunnel furnace, including a sectional view of a pusher mechanism for advancing the welding rod carriers along said tracks.
Figure 8:
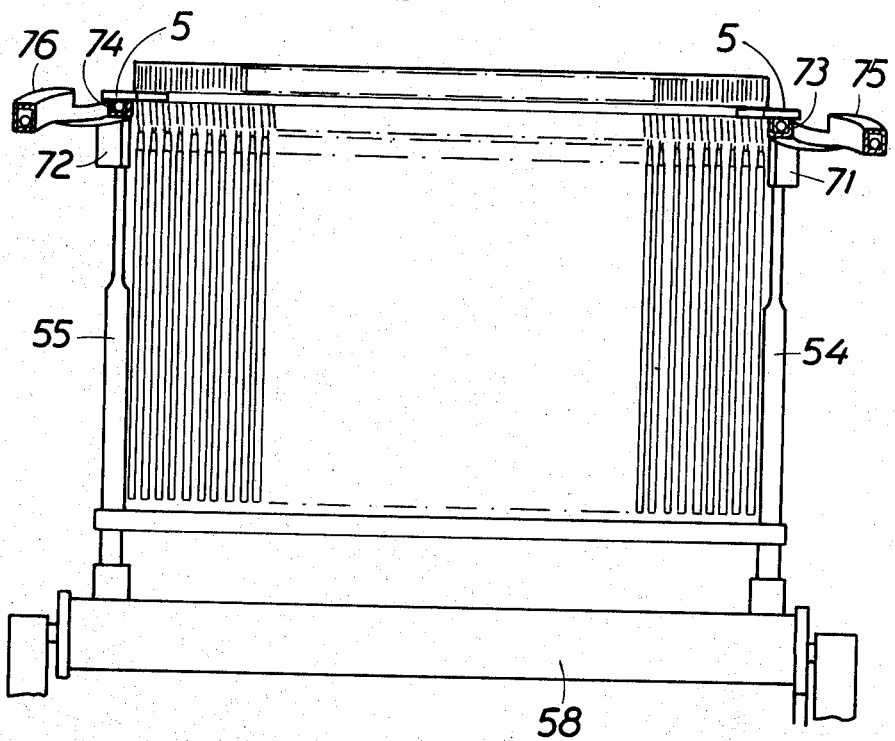
FIG. 8 is an elevational view of the same part of the welding rod fitting station, viewed from the left in FIG. 7, with the entrance end of the tunnel furnace tracks viewed in section along VIII—VIII in FIG. 9.
Figure 9:
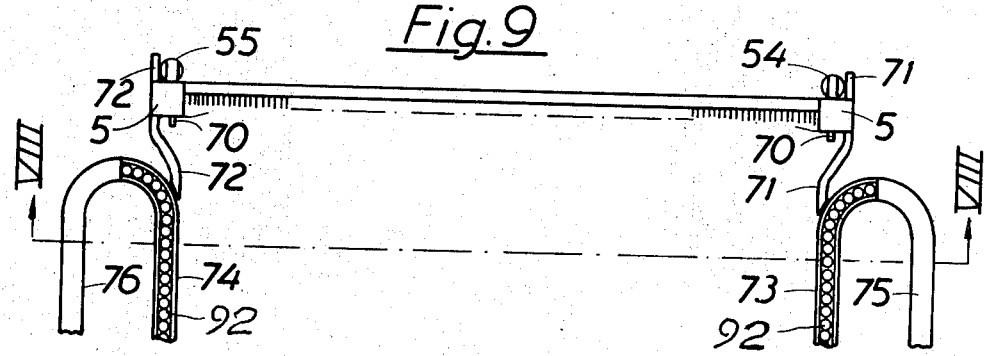
FIG. 9 is a plan view from above of the entrance end of the tunnel furnace tracks.

In the vertical position of the lifting arms 54, 55, their upper ends extend in between and somewhat above a pair of stationary side plates 71, 72 so that the lugs resting on the support pins 70 are somewhat above the upper edges of the side plates 71, 72. The pneumatic cylinder 67 is now activated to retract the lifting arms sufficiently to depose the lugs 5 on the upper edges of the side plates 71, 72. This position is represented in FIGS. 7–9. The lifting arms are then immediately swung back into the stand-by position shown in FIG. 4.

The side plates 71, 72 form an extension forwards of a pair of conveyor tracks, each of which comprises a channel member 73, 74, respectively, containing bearing balls 92 which protrude above the edges of the channel members to support the lugs 5 of the carriers during their passage through the furnace. A stream of balls is delivered to the entrance end of each channel by apparatus including return channels 75, 76 for the returning of balls from the far end of the channel members 73, 74.

Figure 10:
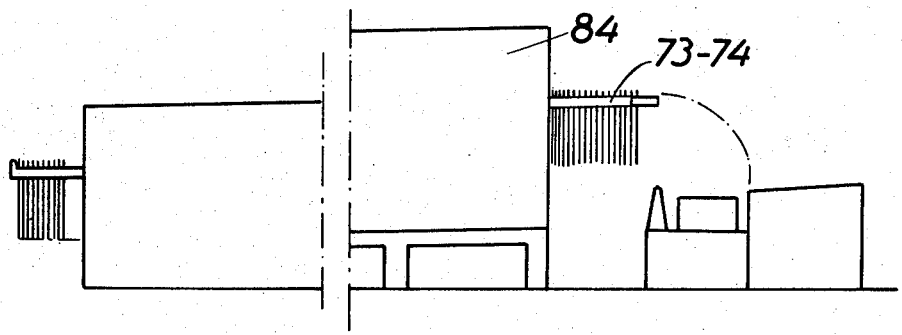
FIG. 10 is a schematical elevation of the entire welding rod drying plant.

From the side plates 71, 72 the welding rod carriers are pushed onto the conveyor tracks described by means of suitable advancing apparatus illustrated in FIG. 7 as a slide 78 displaceable between a pair of stationary guides 77 and carrying a pusher arm 80 angularly displaceable about a shaft 81 by means of a pneumatic cylinder 79. Said cylinder 79 serves to swing down the arm into vertical position, a second pneumatic cylinder 82 being then activated to displace the slide 78 towards the left, so that the pusher plate 83 attached to the arm 80 pushes the carrier 34 along the side plates and on to the ball tracks 73, 74. Said tracks extend through the whole length of the drying tunnel 84 (FIG. 10) and are, as shown in FIG. 10, arranged to incline slightly downwards towards the discharge end. Consequently, the weight of the carriers and their load of welding rods has a component in the direction of the track sufficient to provide all of or the substantial part of the force required to move the carriers along the tracks.

The pneumatic cylinders of the described plant are provided with solenoid valves controlled by a program switch unit, so that the entire series of operations described, commencing with the lifting off of the welding rod carpet from the conveyor 21 and ending with the pushing of the carrier on to the tracks 73, 74 is performed entirely automatically. The program switch unit is arranged to receive a starting impulse from a photo cell or a mechanical switch member arranged at the end of the conveyor 21 so as to be actuated by a welding rod arriving at the end of said conveyor.

The drying tunnel is preferably composed of a tunnel furnace in which the temperature is gradually increased to the maximum required for the drying or baking of the welding rods, and a cooling tunnel in which the welding rods are gradually cooled to a temperature at which they may without danger be subjected to the action of the air at the mouth of the tunnel.

Figure 11:
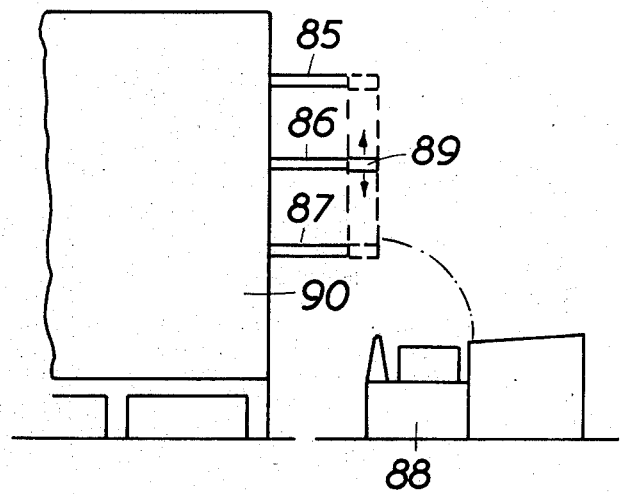
FIG. 11 is a schematical fractional elevation of a modified form of the welding rod drying plant.

In furnaces for large capacities, two or more conveyors may be provided above each other. FIG. 11 illustrates a welding rod drying furnace provided with conveyor tracks 85–87 arranged in three storeys and served by a common welding rod fitting station 88 of the type above described. The lifting arms of said station are arranged to depose the loaded welding rod carriers on an elevator 89, by means of which the welding rod carriers are distributed to the various conveyor tracks.

The welding rod carriers described above are provided with spiral springs serving as welding rod retaining members. Other kinds of retaining members may, however, be used. In one form, the spiral spring is replaced by a strip of elastic material, preferably heat resistant silicon rubber, with a row of notches into which the welding rod ends are forced. Said notches are preferably V-shaped to be able to receive and retain different wire rod diameters. It is also possible to use welding rod retaining members of the known permanent magnet type.

I claim:

1. A furnace plant for the drying or baking of coated arc welding rods having one end stripped of coating comprising a set of welding rod carriers each of which is arranged to carry a plurality of electrodes, a carrier charging station, a belt conveyor for conveying a stream of humid welding rods extending transversely of the conveyor into said carrier charging station, means for supporting one welding rod carrier at a time in said carrier charging station and for causing the electrodes supplied by the belt conveyor to be transferred to said welding carrier, a tunnel furnace, conveyor means for conveying the welding rod carriers progressively through said tunnel furnace, and transfer means for shifting a welding rod carrier from said carrier charging station to said conveyor means wherein the improvement consists in that each of the welding rod carriers comprises a straight, elongated body or frame provided with a supporting lug at each end and with a row of welding rod retaining members spaced along and attached to said body or frame, said retaining members being arranged to engage the welding rods by their stripped ends to maintain the welding rods in a depending position during the passage through the furnace, and in that said conveyor means comprise a pair of tracks for the supporting lugs of said welding rod carriers for supporting said welding rod carriers in a position transverse to the advancement through the furnace.

2. A furnace plant as claimed in claim 1 in which the welding rod carrier supporting means provided in the carrier charging station is arranged to support the welding rod carrier lengthwise of and at a level above said belt conveyor, and which comprises a pair of parallel lifting bars extending along the belt conveyor at either side thereof and means for raising said pair of lifting bars from a lower position in which said lifting bars are below the ends of a row of welding rods supported by said belt conveyor to an upper position in which said lifting bars are above the path of the welding rods advanced by said conveyor and in which the row of welding rods carried by said lifting bars are adjacent to the welding rod carrier.

3. A furnace plant as claimed in claim 2 in which each of the welding rod carriers is provided with a spiral spring extending along and attached to the body or frame of said welding rod carrier, said spiral spring being wound with spaced turns, pairs of adjacent turns of which constitute spring clamps for engaging the stripped ends of the welding rods, and in which the means for supporting a welding rod carrier is displaceable in a lateral direction transversely to the belt conveyor and also displaceable vertically, and which comprises means for displacing said supporting means laterally into a position in which the spiral spring lies below the bare ends of the welding rods carried by the lifting bars, means for subsequently displacing said supporting means upwards to cause the spiral spring to contact and to raise said stripped ends, a pusher blade mounted for vertical movement in respect of said supporting means, and actuating means for said pusher blade to cause the same to force the stripped end of the welding rods into the spaces between the spiral turns of the spring.

4. A furnace plant as claimed in claim 1 in which the welding rod retaining members of the welding rod carrier consist of spring clamps.

5. A furnace plant as claimed in claim 4 in which each of the welding rod carriers is provided with a spiral spring extending along and attached to the body or frame of said welding rod carrier, said spiral spring being wound with spaced turns, pairs of adjacent turns of which constitute the spring clamps for retaining the welding rods.

6. A furnace plant as claimed in claim 5 in which each of the welding rod carriers comprises a pair of spiral springs extending alongside of each other, the pitch of one spring being different from the one of the other spring.

7. A furnace plant as claimed in claim 1 comprising means for adjusting the speed of the belt conveyor.

8. A furnace plant for the drying or baking of coated arc welding rods having one end stripped of coating comprising
 a set of welding rod carriers each of which comprises a straight elongated body or frame provided with supporting lugs at either end and a spiral spring extending along and attached to said body or frame, said spiral spring being wound with spaced turns serving as clamping members for supporting a row of welding rods by their stripped ends, and
 a tunnel furnace provided with conveyor means comprising a pair of tracks for the supporting lugs of said welding rod carriers.

9. A welding rod carrier for carrying a row of coated welding rods during drying or baking, said welding rods having one end stripped of coating, comprising a straight elongated body or frame provided with supporting lugs at either end, and a spiral spring extending long and attached to said body or frame, said spiral spring being wound with spaced turns which constitute clamping means for suspending the welding rods by their stripped ends.

* * * * *